(12) United States Patent
Shimazu et al.

(10) Patent No.: US 6,252,038 B1
(45) Date of Patent: Jun. 26, 2001

(54) METHOD FOR SELECTIVELY SEPARATING HYDROCARBONS

(75) Inventors: Akira Shimazu; Tomoko Matsushita; Tsukasa Miyazaki; Kenichi Ikeda, all of Ibaraki (JP)

(73) Assignee: Petroleum Energy Center, Tokyo (JP)

( * ) Notice: Subject to any disclaimer, the term of this patent is extended or adjusted under 35 U.S.C. 154(b) by 0 days.

(21) Appl. No.: 09/372,508

(22) Filed: Aug. 11, 1999

(30) Foreign Application Priority Data

Aug. 17, 1998 (JP) .................................... 10-230885

(51) Int. Cl.$^7$ ....................................... C08F 6/12
(52) U.S. Cl. .......................... 528/482; 528/480; 521/27; 210/654; 210/653; 210/650
(58) Field of Search .................... 528/480, 482; 521/27; 210/654, 653, 650

(56) References Cited

U.S. PATENT DOCUMENTS

| | | |
|---|---|---|
| 2,930,754 | 3/1960 | Stuckey . |
| 2,958,656 | 11/1960 | Stuckey . |
| 3,822,202 | 7/1974 | Hoehn . |
| 3,899,309 | 8/1975 | Hoehn et al. . |
| 3,959,350 | 5/1976 | Rogers . |
| 4,532,029 | 7/1985 | Black et al. . |
| 4,532,041 | 7/1985 | Shuey et al. . |
| 4,645,824 | 2/1987 | Landis et al. . |
| 4,705,540 | 11/1987 | Hayes . |
| 4,717,393 | 1/1988 | Hayes . |
| 4,717,394 | 1/1988 | Hayes . |
| 4,838,900 | 6/1989 | Hayes . |
| 4,897,092 | 1/1990 | Burgoyne, Jr. et al. . |
| 4,929,405 | 5/1990 | Kohn . |
| 4,932,982 | 6/1990 | Hayes . |
| 4,981,497 | 1/1991 | Hayes . |
| 5,042,992 | 8/1991 | Blinka et al. . |
| 5,165,963 | 11/1992 | Matsumoto et al. . |

OTHER PUBLICATIONS

Chem Abstract: 129: 162477 "Selective separation membranes for unsaturated hydrocarbons and selective separation methods" Akira et al. Jul. 1998.*
Chem Abstract: 126: 106016 "Selective separation of unsaturated hydrocarbons by membranes" "Shimazu, Akira, et al" 1996.*
Akira Ito et al.; "Permeation of Propane and Propylene through Cellulosic Polymer Membranes"; Journal of Applied Polymer Science, vol. 38, pp. 483–490 (1989).

\* cited by examiner

*Primary Examiner*—Duc Truong
(74) *Attorney, Agent, or Firm*—Rosenthal & Osha, L.L.P.

(57) ABSTRACT

A method for separating specific hydrocarbons from a hydrocarbon mixture of hydrocarbons using a membrane made of a fluorine-containing polyimide resin having high separation ability with regard to certain hydrocarbons, and a high resistance to hydrocarbon is disclosed. The method is of high practicability with regard to performance and cost. Certain hydrocarbons permeate selectively and are separated by bringing a hydrocarbon mixture into contact with a membrane having a fluorine-containing polyimide resin as its main component, whose main component is the minimum repeating unit expressed by Formula 1

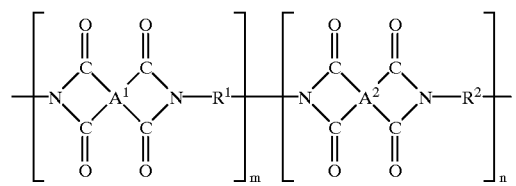

The mixture is passed through the membrane, thereby selectively permeating, for example, unsaturated hydrocarbons. The main component of the membrane is a fluorine-containing polyimide resin with a fractional free volume in the range of 0.130–0.175.

6 Claims, No Drawings

METHOD FOR SELECTIVELY SEPARATING HYDROCARBONS

BACKGROUND OF THE INVENTION

1. Field of the Invention

The present invention relates to a method for separating certain hydrocarbons from a mixtures of hydrocarbons. More specifically, the present invention relates to a method for separating and concentrating specific hydrocarbons from a mixture of hydrocarbons. This is a problem commonly found in the petroleum refining industry or petrochemical industry.

2. Description of the Prior Art

In the petroleum refining industry and the petrochemical industry, methods for separating certain hydrocarbons from mixtures of hydrocarbons by using a separating membrane have been under scientific and economical development for many years. To this date, many approaches have been published. For example, U.S. Pat. No. 2,958,656 proposes a method wherein a mixture of hydrocarbons (that is, naphtha) is supplied to a non-porous cellulose ether membrane, through which one portion of the hydrocarbons is permeated. Subsequently, the permeated hydrocarbons are removed using a washing gas or a washing liquid, thereby separating unsaturated compounds, saturated compounds and aromatic compounds. U.S. Pat. No. 2,930,754 proposes a method wherein one portion of the mixture, having a distillate temperature approximately equal to the boiling point of gasoline, is selectively permeated through a non-porous cellulose ether membrane. The permeated hydrocarbons are then removed using a washing gas or a washing liquid, thereby separating unsaturated hydrocarbons and other hydrocarbons such as aromatic compounds. Many fluorine-containing polyimides are known to be materials for membrane separation with excellent heat resistance and gas permeatability. Aromatic polyimides containing fluorine are disclosed, for example, in Publication of Unexamined Japanese Patent Application (Tokkai) No. Hei 5-7749, U.S. Pat. No. 3,822,202, U.S. Pat. No. 3,899,309, U.S. Pat. No. 4,532,041, U.S. Pat. No. 4,645,824, U.S. Pat. No. 4,705,540, U.S. Pat. No. 4,717,393, U.S. Pat. No. 4,717,394, U.S. Pat. No. 4,838,900, U.S. Pat. No. 4,897,092, U.S. Pat. No. 4,932,982, U.S. Pat. No. 4,929,405, U.S. Pat. No. 4,981,497, and U.S. Pat. No. 5,042,992.

However, these conventional methods have an insufficient resistance of most of the separating membranes against aromatic hydrocarbons, unsaturated hydrocarbons, saturated hydrocarbons, etc. and have difficulties isolating specific hydrocarbons. Therefore, their use on an industrial scale is severely limited because of poor performance and high costs.

SUMMARY OF THE INVENTION

It is an object of the present invention to solve these problems, and to provide a method for selectively separating certain hydrocarbons from a mixture of hydrocarbons with a membrane that is highly resistant against hydrocarbons, and has excellent ability to separate specific hydrocarbons etc. from a mixture of hydrocarbons. Furthermore, the membrane should be of low cost and easy to implement.

In order to achieve these objects, a method for selectively separating hydrocarbons in accordance with the present invention comprises contacting a mixture including a hydrocarbon with one surface of a separating membrane having as its main component a fluorine-containing polyimide resin whose fractional free volume is in the range of 0.130–0.175; and passing the mixture through the separating membrane, so that a particular hydrocarbon permeates selectively and is thereby separated.

In the present invention, the fractional free volume (FFV) of the fluorine-containing polyimide resin is determined from $$FFV=(V_{298}-V_0)/V_{298} \qquad \text{Equation 1}$$

wherein $V_{298}$ is the molar volume of the polyimide resin at 25° C. This is determined by dividing the molecular weight of the unit structure of the polyimide resin by the density of the polyimide resin at 25° C. $V_0$ is the molar volume of the molecule at 0 K (zero Kelvin) as determined by the Bondi formula (see Equation 1) and is equal to the van-der-Waals volume of the polyimide resin multiplied by 0.130. If the fractionl free volume of the polyimide resin is less than 0.130, the molecular chain packing becomes excessively strong, and there is the danger that the permeability for hydrocarbons becomes too small, which is not preferable. Furthermore, if the fractional free volume of the polyimide resin is higher than 0.175, the plasticization due to the hydrocarbons becomes considerable, which has the effect of decreasing the ability to separate decreases, which is also not preferable.

A separating membrane whose main component is a fluorine-containing polyimide resin with a fractional free volume of 0.130–0.175 can be prepared as explained in the examples below.

In the above-noted method, it is preferable that the certain hydrocarbon, which is permeated selectively and separated, includes at least one hydrocarbon selected from the group consisting of unsaturated hydrocarbons and aromatic hydrocarbons. In this method, it is also preferable that a structural unit of the repeating molecular structure constituting the fluorine-containing polyimide resin comprises at least one —$CF_3$ group. Furthermore, in this method, it is preferable that a main component of the fluorine-containing polyimide resin is a repeating molecular structure that is substantially expressed by

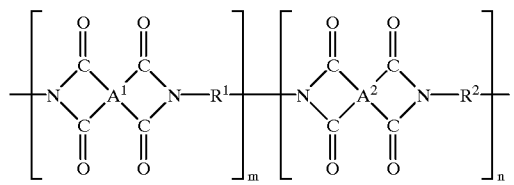

Formula 1 wherein
$A^1$ and $A^2$ are tetravalent organic groups comprising an aromatic, alicyclic or aliphatic hydrocarbon,
$R^1$ and $R^2$ are divalent aromatic, alicyclic or aliphatic hydrocarbon groups, or divalent organic groups wherein these hydrocarbon groups is bonded with a divalent organic group,
at least one of the organic groups $A^1$ and $A^2$ comprises at least three fluorine atoms;
m and n indicate the polymerization units;
$0<m<1$, $0<n<1$, and $m+n=1$; and
the main component is either a random copolymer or a block copolymer.

It is preferable that the weight-average molecular weight of the polymer in Formula 1 is in the range of 30,000–1,000,000.

The fluorine-containing polyimide resin used in the present invention contributes to the ability to separate specific hydrocarbons, and is characterized in that its fractional free volume is in the range of 0.130–0.175. The permeability of a gas through a homogenous polymer depends on the process of dissolving the gas into the polymer and the process of diffusing it throughout the polymer. In particular, permeability is commonly expressed by the product of the solubility coefficient of the gas into the polymer and the diffusion coefficient of the gas in the polymer. Therefore, utilizing the differences in solubility or diffusivity, a gas mixture can be separated into several components. When permeating a hydrocarbon with a carbon number of three ($C_3$) or more, the macromolecules of the membrane material usually plasticize due to the permeated components, and as a result, the free volume of the macromolecules increases, thereby increasing the diffusivity. In the case of glassy macromolecules such as polyimide, excessive plasticization leads to a large increase in free volume, and as a result, the separation ability, i.e. the ability to sieve using the difference in the molecule size of certain permeation components, deteriorates. On the other hand, when there is no excessive plasticization due to the hydrocarbons to be separated, the permeability becomes too small, which is not desirable. The inventors of the present invention have concentrated on this aspect, and came to the result that if a fluorine-containing polyimide resin with a fractional free volume of 0.130–0.175 is used for the membrane material, extreme plasticization due to hydrocarbons can be averted and a separating membrane with high separation ability with regard to certain hydrocarbons can be obtained.

DESCRIPTION OF THE PREFERRED EMBODIMENTS

In the present invention, there is no requirement that the tetravalent organic groups have at least three fluorine atoms as shown in the above-noted general formula (1), as long as the protons of the tetravalent organic groups $A^1$ or $A^2$ are substituted with fluorine atoms or groups including a fluorine atom. More preferably, at least one proton of the etravalent organic groups $A^1$ or $A^2$ is substituted by one —$CF_3$ group, and it is referable to use, for example, a tetravalent organic group as expressed by

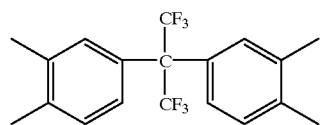

Formula 2

There is no particular restriction regarding the divalent organic groups $R^1$ and $R^2$, but it is preferable to use a structure including phenylene in the main chain. In particular, it is preferable to use, for example, the divalent organic groups of the formulas (3) to (8).

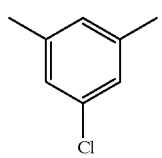

Formula 3

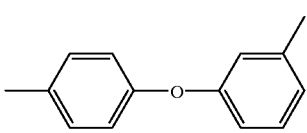

Formula 4

-continued

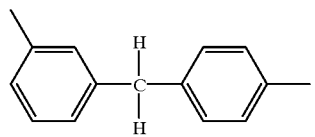

Formula 5

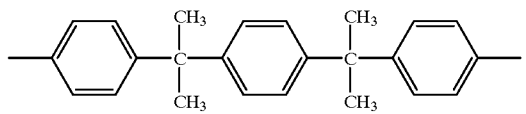

Formula 6

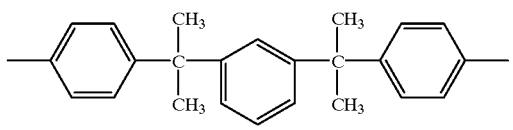

Formula 7

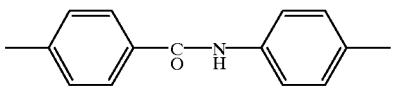

Formula 8

The fluorine-containing polyimide resin used in the present invention can be used alone, but it is also possible to use a mixture of two kinds or more. Moreover, it can also be a copolymer or a mixture with a polymer other than a fluorine-containing polyimide resin, such as polysulfone or polyethersulfone, of not more than 50 mol %.

The fluorine-containing polyimide resin used for the present invention can be obtained by one of the publicly known polymerization methods, such as the method disclosed in U.S. Pat. No. 3,959,350, using tetracarboxylate dianhydrate and diamine components. For example, polyamic acid is polymerized by mixing approximately the same mole amount of tetracarboxylate dianhydrate and a diamine compound to a polar solvent, and stirring them at less than ca. 80° C., preferably at 0° C.–60° C. There is no particular restriction regarding the polar solvent used here, but it is preferable to use, for example, N-methyl pyrolidone, pyridine, dimethyl acetoamide, dimethyl formamide, dimethyl sulfoamide, tetramethyl urea, phenol, or cresol.

A tertiary amine compound such as trimethyl amine, triethyl amine or pyridine, and an imidization accelerator such as acetic anhydride, thionyl chloride or carbodiimide are added to the resulting polar solvent liquid of polyamic acid, which is stirred at a temperature of 5–150° C. to perform imidization. Without an accelerator, the imidization can be performed by heating the above-noted polyamic acid liquid to 100–400° C., preferably 120–300° C.

After the imidization reaction, a polyimide resin that is suitable as a membrane material is obtained by dripping this liquid into a large amount of liquid such as acetone, alcohol, or water for purification. This removes both the polar solvent and the imidization accelerator used for the polymerization.

Moreover, if the imidization reaction is performed without adding an imidization accelerator, a polyimide resin that is suitable as a membrane material is obtained by dripping the polyamic acid liquid into a large amount of liquid such as acetone or alcohol, evaporating the solvent from the resulting polyamic acid powder and polyamic acid liquid, and heating the resulting solid polyamic acid (it is also possible to add a precipitating agent during the evaporation to form and filtrate the polyamic acid powder) to 100–400° C. to perform imidization.

There is no particular limitation to the method for producing a membrane used in the present invention. Possible methods include, for example, preparing a membrane-forming liquid by dissolving the above-noted fluorine-containing polyimide resin into an appropriate solvent, flow-expanding the membrane-forming liquid to a certain thickness on a plate or a tube with a smooth surface, such as glass, metal, or plastic, or a porous support, such as a nonwoven fabric, followed by a heat-treatment (this method is also called "dry membrane production"). Other possible methods include flow-expanding the membrane-forming liquid to a certain thickness on a smooth tube, such as glass, metal, or plastic, or a porous support, such as a woven fabric or a nonwoven fabric, immerse it in a coagulating liquid (i.e. a solvent that does not dissolve the fluorine-containing polyimide resin in the membrane-forming liquid, but which is compatible with the organic solvent in the membrane-forming liquid) or preparing a non-symmetric membrane by extruding the membrane-forming liquid from a concentric-circular dual nozzle and immersing it in the coagulating liquid and then drying the membrane (this method is also called "wet membrane production").

There is no particular restriction with regard to the solvent for the fluorine-containing polyimide resin. Examples of such a solvent include N-methyl-2-pyrolidone, dimethyl acetoamide, dimethyl formamide, dimethyl sulfoxide, diethyleneglycol dimethylether, and 1,2-dimethoxymethane.

The concentration of the polyimide solvent for the membrane-forming liquid is 3–40 wt %, preferably 10–30 wt %. Moreover, to prepare the membrane-forming liquid, it is possible to add, for example, a swelling agent, a dispersing agent, or a thickener, if necessary. As means for flow-expanding the membrane-forming liquid, it is possible to use, for example, a doctor knife, a doctor plate, or an applicator.

It is preferable that after the flow-expansion of the membrane-forming liquid, heat-treatment is performed at a temperature that is sufficiently high to remove the solvent in the membrane-forming liquid, and that is below the glass transition point of the polyimide resin.

In this wet membrane production method, the coagulating liquid used for the immersion to remove the organic solvent does not dissolve the fluorine-containing polyimide resin. Furthermore, there is no particular restriction with respect to the coagulating liquid, as long as a solvent is used that is compatible with the solvent for the membrane-forming liquid. Examples of such solvents include water and alcohols such as ethanol, methanol, isopropyl alcohol, and mixtures thereof; however water is preferable. There is no particular restriction with regard to the temperature of the coagulating liquid during the immersion to remove the organic solvent in the membrane-forming liquid, but a temperature of 0–50° C. is preferable.

There is no particular restriction with regard to the shape of the membrane in the present invention, and the present invention can be applied appropriately to tube-shaped (including hollow fibers) and flat membranes.

EXAMPLES

The following is an explanation of examples of the present invention. However, the present invention is in no way limited to these examples.

Example 1

0.0761 mol of 5,5'-2,2'-trifluoro-1-(trifluoromethyl) ethylidene-bis-1,3-isobenzofurandione (6FDA) and 0.0761 mol of 4,4'-diaminobenzoanilide (DABA) were given to a solvent mixture of 200 ml N-methyl-2-pyrolidone (NMP) and 50 ml o-dichlorobenzene. Under an argon atmosphere, the flask containing this mixture was heated from room temperature to 170° C. with stirring. At 170° C., the imidization reaction was performed while azeotroping of the water produced. After the reaction, the flask was cooled down to room temperature, and the polymerization liquid was dropped into an excess quantity of water, while stirring rapidly, and purified. Then it was further purified with methanol, and a fluorine-containing polyimide resin was obtained, whose structural units are the minimum repeating units expressed by Formula 9.

Formula 9

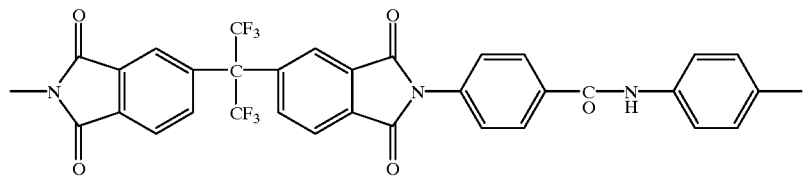

Then, 9 parts by weight of the fluorine-containing polyimide resin, whose structural units are the minimum repeating units expressed by Formula 9, were diluted through the addition of 91 parts by weight of NMP. Dissolution was performed while stirring at 100° C. for six hours. Then, a membrane-forming liquid was prepared by filtering, keeping the resulting liquid still, and sufficiently defoaming it. Using an applicator, the membrane-forming liquid was flow-expanded on a glass plate to 20 cm width and 300 μm thickness. Heat-treatment was performed for one hour at 110° C., for one hour at 150° C., for three hours at 200° C., followed by 72 hours in a vacuum at 200° C. Thus, a homogenous membrane made of a fluorine-containing polyimide resin of 20–30 μm thickness was obtained. The fractional free volume of the fluorine-containing polyimide in the resulting membrane according to Equation 1 was determined to be 0.130, thereby satisfying the condition for the present invention. At 25° C. and a supply pressure of 2 atm, the separating ability and permeability, for a 50/50 mol % gas mixture of propylene and propane and the resistance against an octane liquid containing 30 wt % benzene of the resulting homogenous membrane was determined. The results of these tests are shown in Table 1 below.

Example 2

A fluorine-containing polyimide resin was synthesized in the same manner as described for Example 1, except that instead of the 4,4'-diaminobenzoanilide (DABA), 3,4'-diaminodiphenylether (34'DPE) was used. A homogenous membrane made of a fluorine-containing polyimide resin, whose structural units are the minimum repeating units expressed by Formula 10, was obtained.

Formula 10

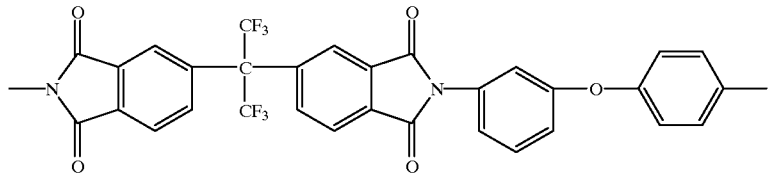

The free volume fraction of the fluorine-containing polyimide in the resulting homogenous membrane according to Equation 1 was determined to be 0.159, thereby satisfying the condition for the present invention. Then, at 25° C. and a supply pressure of 2 atm, the separating ability and permeability for a 50/50 mol % gas mixture of 1,3-butadiene and n-butane and the resistance against an octane liquid containing 30 wt % benzene of the resulting homogenous membrane was determined. The results of these tests are shown in Table 1 below.

Comparative Example 1

A fluorine-containing polyimide resin was synthesized in the same manner as described for Example 1, except that instead of the 4,4'-diaminobenzoanilide (DABA), 2,4,6-trimethyl-1,3-phenylenediamine (TMMPD) was used. A homogenous membrane made of a fluorine-containing containing polyimide resin, whose structural units are the minimum repeating units expressed by Formula 11, was obtained.

Formula 11

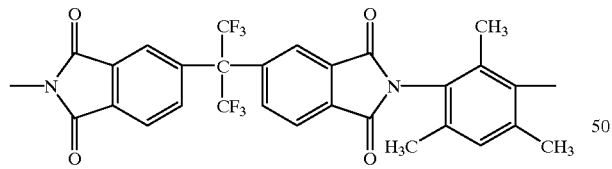

The fractional free volume of the fluorine-containing polyimide in the resulting homogenous membrane according to Equation 1 was determined to be 0.189, therefore not satisfying the conditions for the present invention. Then, at 25° C. and a supply pressure of 2 atm, the separating ability and permeability for a 50/50 mol % gas mixture of 1,3-butadiene and n-butane and the resistance against an octane liquid containing 30 wt % benzene of the resulting homogenous membrane was determined. The results of these tests are shown in Table 1 below.

Comparative Example 2

In this comparative example, a polysulfone resin (PSF) was used instead of the fluorine-containing polyimide resin. 82 parts by weight of NMP were added as organic solvent to 18 parts by weight of the polysulfone resin, and 91 parts by weight of NMP were added as organic solvent, and dissolution was performed while stirring at 100° C. for twelve hours. Then, a membrane-forming liquid was prepared by filtering, keeping the resulting liquid still, and sufficiently defoaming it. Using an applicator, the resulting membrane-forming liquid was flow-expanded on a glass plate to 20 cm width and 300 μm thickness. Heat-treatment was performed for one hour at 110° C., for three hours at 150° C., followed by 72 hours in a vacuum at 150° C. Thus, a homogenous membrane made of polysulfone of 20–30 μm thickness was obtained. The free fractional volume of the polysulfone resin in the resulting homogenous membrane according to Equation 1 was determined to be 0.150. Thus, the value for the free volume fraction satisfied the conditions for the present invention, but the material for the membrane did not satisfy the conditions for the present invention. Then, at 25° C. and a supply pressure of 2 atm, the separating ability and permeability, for a 50/50 mol % gas mixture of propylene and propane and the resistance against an octane liquid containing 30 wt % benzene of the resulting homogenous membrane were determined. The results of these tests are shown in Table 1 below.

As is shown in Table 1, the examples of the present invention have a higher separating ability with regard to certain hydrocarbons such as propylene and 1,3-butadiene than the comparative examples, and better resistance against mixtures of aromatic hydrocarbons and saturated hydrocarbons.

TABLE 1

| membrane material (abb. name) | permeability coefficient | separation factor | resistance against hydrocarbons |
|---|---|---|---|
| Ex. 1 6FDA-DABA | $P(C_3H_6)$ $9.8 \times 10^{-12}$ | $\alpha(C_3H_6/C_3H_8)$ 240 | 83 |
| Ex. 2 6FDA-34'DPE | $P(C_4H_6)$ $1.4 \times 10^{-11}$ | $\alpha(C_4H_6/C_4H_{10})$ 61 | 98 |
| Comp. Ex. 1 6FDA-TMMPD | $P(C_4H_6)$ $1.7 \times 10^{-6}$ | $\alpha(C_4H_6/C_4H_{10})$ 1.3 | measurement not possible due to dissolution |
| Comp. Ex. 2 PSF | $P(C_3H_6)$ $4.5 \times 10^{-11}$ | $\alpha(C_3H_6/C_3H_8)$ 11 | measurement not possible due to dissolution |

Notes:
(1) $P(C_3H_6)$ is the permeability coefficient [$cm^3$(STP)cm/$cm^2$s cmHg] for propylene when supplying a 50/50 mol % gas mixture of propane and propylene at 25° C. and 2 atm supply pressure.

TABLE 1-continued

| membrane material (abb. name) | permeability coefficient | separation factor | resistance against hydrocarbons |
|---|---|---|---|

(2) P(C$_4$H$_6$) is the permeability coefficient [cm$^3$(STP)cm/cm$^2$s cmHg] for 1.3-butadiene when supplying a 50/50 mol % gas mixture of 1.3-butadiene and n-propane at 25° .C and 2 atm supply pressure.
(3) α(C$_3$H$_6$/C$_3$H$_8$) is the separation factor [—] for propylene and propane when supplying a 50/50 mol % gas mixture of propane and propylene at 25° C. and 2 atm supply pressure.
(4) α(C$_4$H$_6$/C$_4$H$_{10}$) is the separation factor [—] for 1.3-butadiene and n-propane when supplying a 50/50 mol % gas mixture of 1.3-butadiene and n-propane at 25° C. and 2 atm supply pressure.
(5) "Resistance against hydrocarbons" is the retention ratio [%] of the strength of the homogeneous membrane before and after immersion for 600 h in a liquid of benzene and octane.
(6) "Retention ratio [%] of the strength of the homogenous membrane" is the physical value defined by
[ { (tensile breaking strength of the homogenous membrane after immersion for 600 h in an octane liquid comprising 30% benzene/tensile breaking elongation) }/{tensile breaking strength of the homogenous membrane before immersion for 600 h in an octane liquid comprising 30% benzene/ tensile breaking elongation) } ] × 100
as determined in a tensile breaking experiment of the homogenous membrane at 25° C. and 20 mm/min drawing speed.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A method for selectively separating hydrocarbons, comprising:
   contacting a mixture including a hydrocarbon with one surface of a separating membrane having as its main component a fluorine-containing polyimide resin whose fractional free volume is in a range of 0.130–0.175; and
   passing the mixture through the separating membrane so that a certain hydrocarbon permeates selectively and is separated.

2. The method according to claim 1, wherein the certain hydrocarbon that is permeated selectively and separated includes at least one hydrocarbon selected from the group consisting of unsaturated hydrocarbons and aromatic hydrocarbons.

3. The method according to claim 1, wherein a structural unit of the repeating molecular structure constituting the fluorine-containing polyimide resin comprises at least one —CF$_3$ group.

4. The method according to claim 1, wherein a main component of the fluorine-containing polyimide resin is a repeating molecular structure that is substantially expressed by

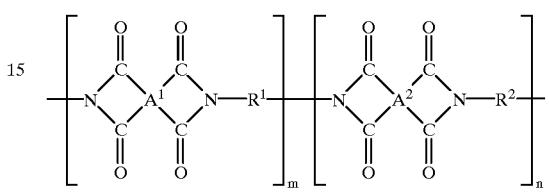

Formula 1 wherein

A$^1$ and A$^2$ are tetravalent organic groups comprising an aromatic, alicyclic or aliphatic hydrocarbon, R$^1$ and R$^2$ are divalent aromatic, alicyclic or aliphatic hydrocarbon groups, or divalent organic groups wherein these hydrocarbon groups are bonded with a divalent organic group, at least one of the organic groups A$^1$ and A$^2$ comprises at least three fluorine atoms;

m and n indicate the polymerization units;

0<m<1, 0<n<1, and m+n=1; and the main component can be a random copolymer or a block copolymer.

5. A method for selectively separating hydrocarbons, comprising:
   contacting a mixture including a hydrocarbon with one surface of a separating membrane having as its main component a fluorine-containing polyimide resin whose fractional free volume is in a range of 0.130–0.175; and
   passing the mixture through the separating membrane so that a certain hydrocarbon permeates selectively and is separated, wherein the separating membrane has a molecular structure that is substantially expressed by

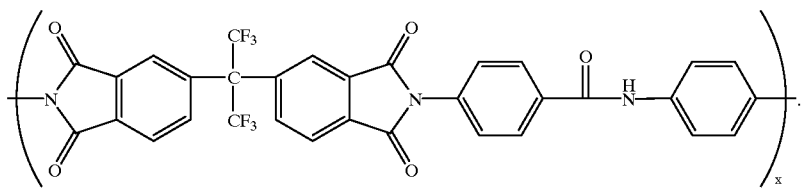

6. A method for selectively separating hydrocarbons, comprising:

contacting a mixture including a hydrocarbon with one surface of a separating membrane having as its main component a fluorine-containing polyimide resin whose fractional free volume is in a range of 0.130–0.175; and passing the mixture through the separating membrane so that a certain hydrocarbon permeates selectively and is separated, wherein the separating membrane has a molecular structure that is substantially expressed by

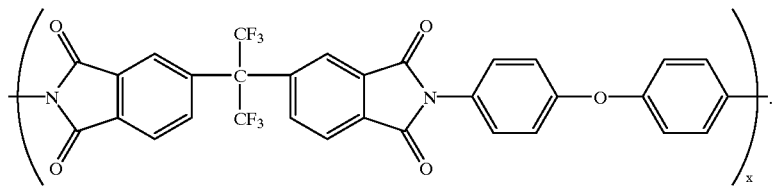

* * * * *